A. J. BILLOWS.
AERATION OF LIQUIDS.
APPLICATION FILED JULY 9, 1910.

1,017,240.

Patented Feb. 13, 1912.
4 SHEETS—SHEET 3.

Witnesses
Frederick S. Baden
Irene Lefkowitz

Inventor
ARTHUR JAMES BILLOWS
BY
Townsend & Decker
ATTORNEYS

A. J. BILLOWS.
AERATION OF LIQUIDS.
APPLICATION FILED JULY 9, 1910.
1,017,240.
Patented Feb. 13, 1912.
4 SHEETS—SHEET 4.
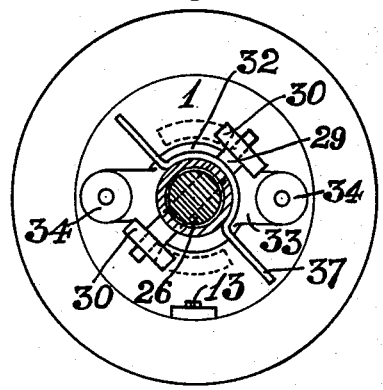
Fig. 4.
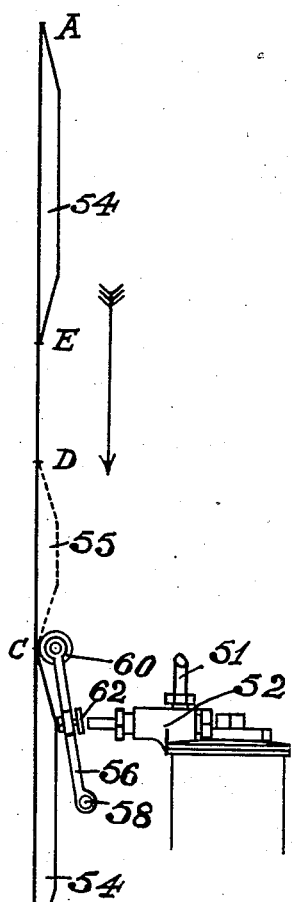
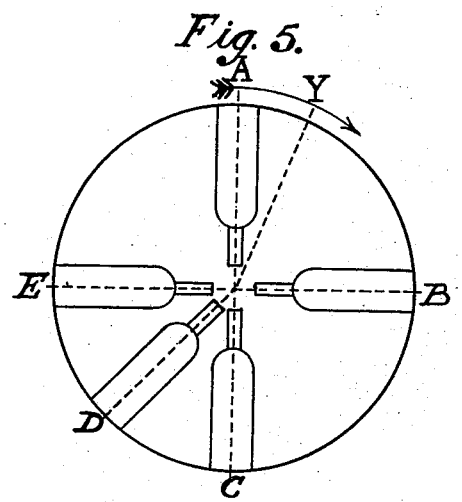
Fig. 5.
Fig. 6.
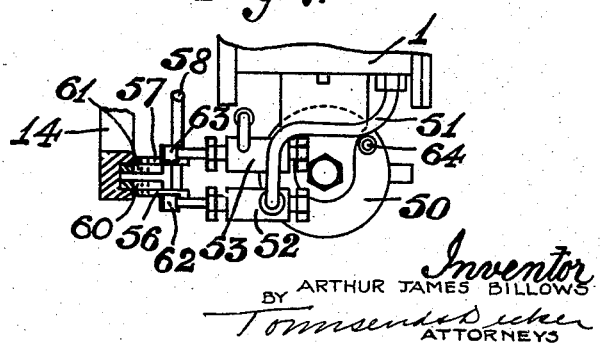
Fig. 7.
Witnesses
Frederick S Baden
Onere Lefkowitz
Inventor
ARTHUR JAMES BILLOWS
BY Townsend _____
ATTORNEYS

UNITED STATES PATENT OFFICE.

ARTHUR JAMES BILLOWS, OF MELBOURNE, VICTORIA, AUSTRALIA.

AERATION OF LIQUIDS.

1,017,240.   Specification of Letters Patent.   Patented Feb. 13, 1912.

Application filed July 9, 1910. Serial No. 571,106.

*To all whom it may concern:*

Be it known that I, ARTHUR JAMES BILLOWS, a subject of the King of Great Britain and Ireland, residing at Melbourne, in the State of Victoria, Commonwealth of Australia, have invented a new and useful Improvement in or Relating to the Aeration of Liquids, of which the following is a specification.

This invention has relation to the aeration of liquids in apparatus of the kind in which the liquid is aerated in a stationary aerating chamber into which the gas and the liquid are introduced separately in small and proportionate quantities.

Apparatus as hereinafter described in accordance with this invention may be used either for aerating and bottling the aerated liquid, or for aerating liquid which is then drawn off through a draft arm or other device and delivered into a drinking glass or other receptacle.

According to this invention, the gas supply is connected with the stationary aerating chamber through an expansion chamber, said expansion chamber being cut off from the stationary aerating chamber by a valve which is adapted to be opened mechanically at intervals and is further such that it will open automatically should an excess of liquid collect in the aerating chamber and allow the liquid to pass into the expansion chamber so as to reduce the quantity of liquid in the aerating chamber.

In order that the invention and the improvements in the apparatus of the kind mentioned may be clearly understood, reference will now be made to the accompanying drawings in which:—

Figure 1:
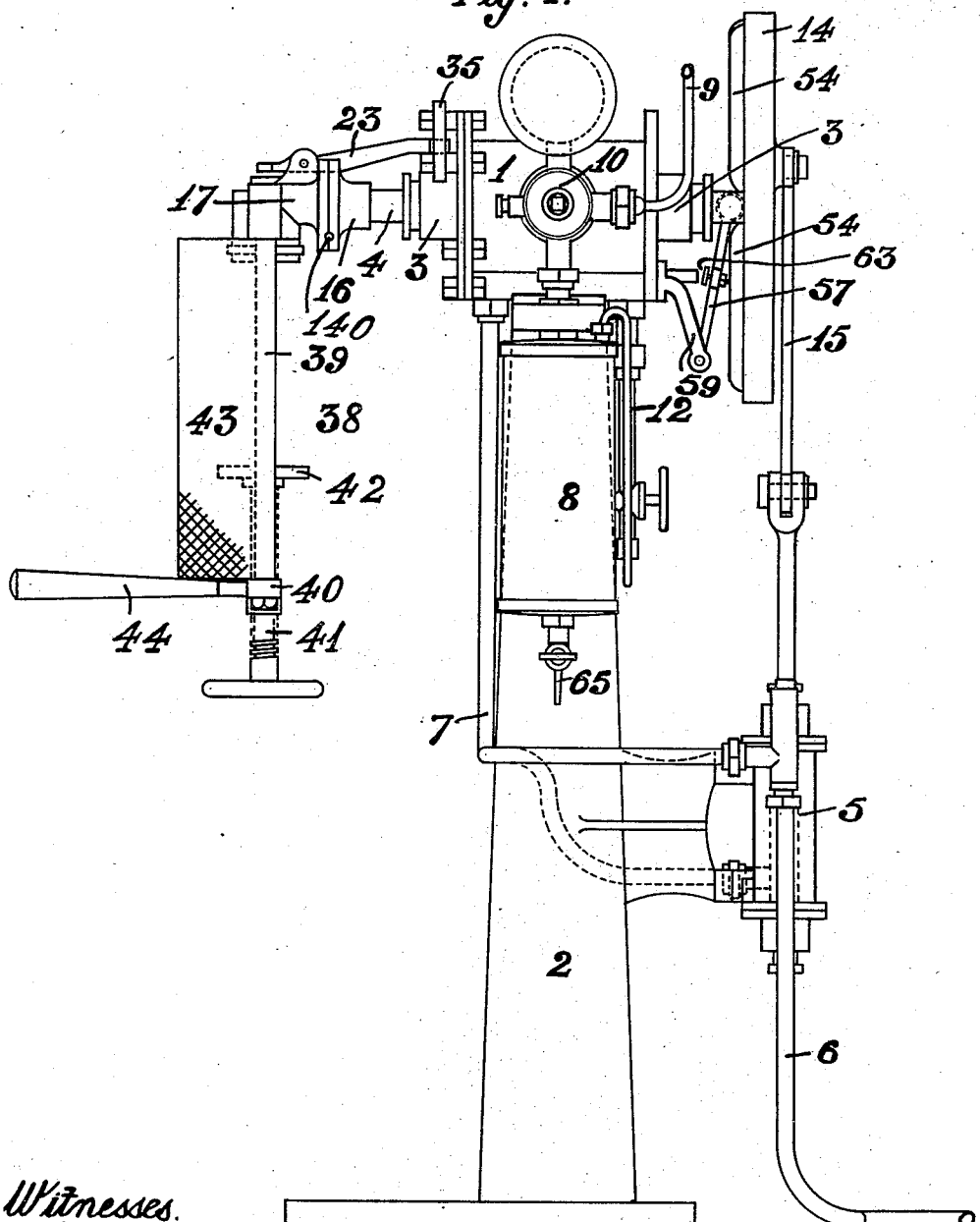
Figure 2:
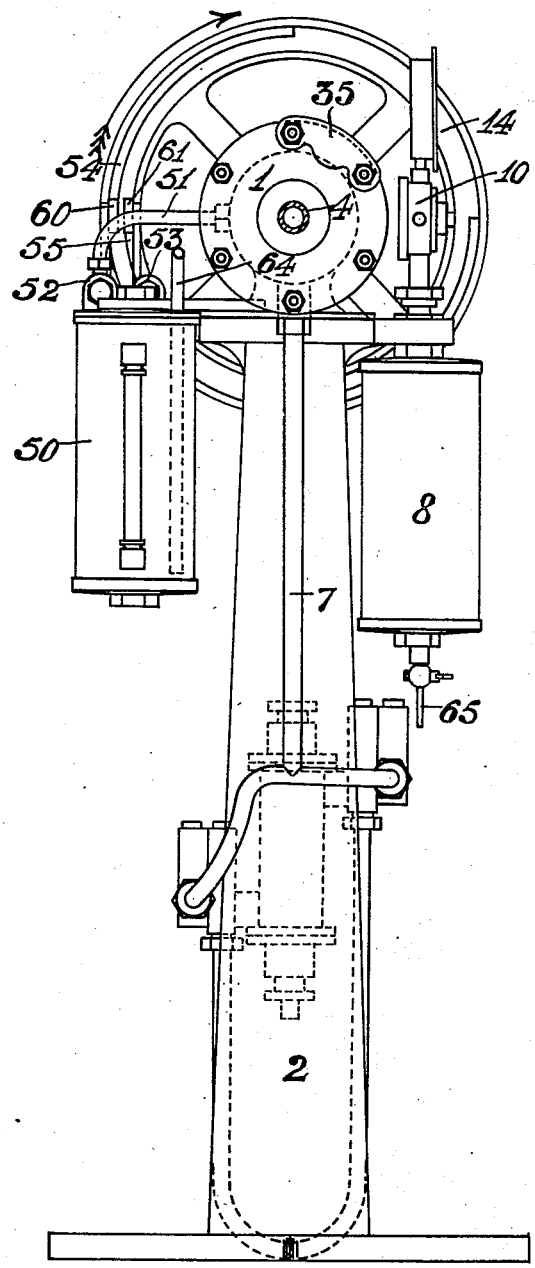
Figure 3:
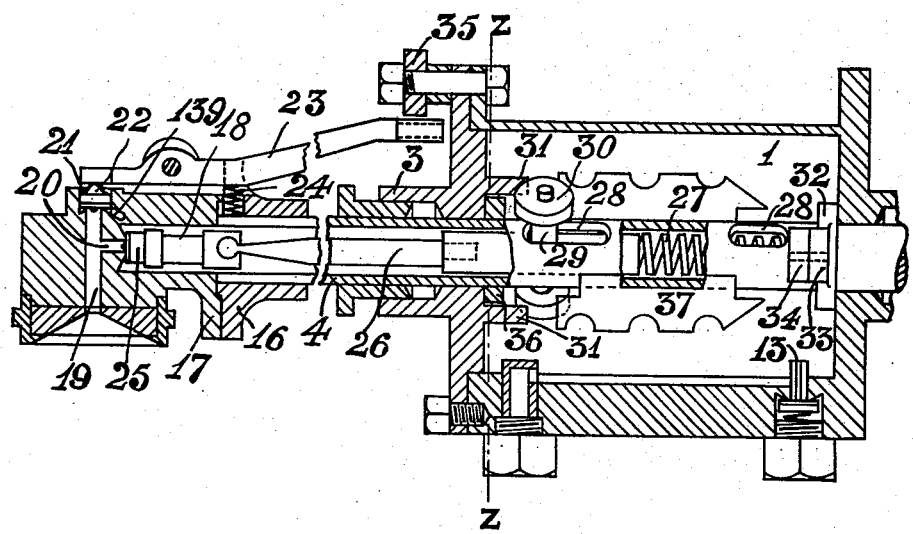

Figures 1 and 2 are elevations of the apparatus, the views being at right angles; Fig. 3 is a longitudinal section through the stationary aerating chamber and certain parts in connection therewith; Fig. 4 is a cross section on the line Z—Z of Fig. 3; Figs. 5 to 7 will be hereinafter more particularly referred to.

1 is the stationary aerating chamber. This chamber is, preferably and as usual, of cylindrical shape and is rigidly mounted on a standard 2 that is fixed to the floor and also serves as a carrier for other parts of the apparatus. The chamber 1 is closed at both ends and the end closures are such that they may be removed to permit of inspection of, and access to, the interior of the chamber and the parts therein, or, as shown, only one end closure may be removable. Whichever of the constructions is adopted, each end closure is formed with a stuffing box and gland 3 that also serves as a bearing for a shaft 4, that is rotatable and the ends of which extend beyond the exteriors of the stuffing boxes. The shaft 4 is hollow for a portion of its length, the hollow portion extending for such a length that, when the shaft 4 is in position, the inner end thereof is within the chamber 1 and is in proximity to the end closure shown at the right hand side of Fig. 3. It will, however, be apparent from what follows that the length of the hollow portion of the shaft can be such that the inner end thereof will come farther inward of, or be outside of, the aerating chamber.

5 is a pump. This pump, which is of the reciprocatory type, may be either single or double acting and is mounted on the standard 2. In the construction illustrated, the pump is of the double acting type.

6 is the suction pipe of the pump. 7 is the delivery pipe thereof; this pipe is in connection with the lower portion of the chamber 1.

8 is a vessel or cylinder mounted on the standard 2 and connected, on the one hand, with the gas supply through a pipe 9, in which is a reducing valve 10, and, on the other hand, with the lower portion of the aerating chamber 1 through a pipe 12.

13 is a valve designed to control the pipe 12 and placed so that its spindle projects into the interior of the aerating chamber 1. The valve 13 is held to its seat by the pressure of the gas within the vessel 8 and by the action of a spring and closes or interrupts the connection between the aerating chamber and the vessel 8. The valve is operated twice in every revolution of the shaft 4 by the application of pressure to its spindle in a direction opposed to that exerted by the gas and the spring. When the valve is operated, communication is opened between the vessel 8 and the aerating chamber and gas flows from the former to the latter. The vessel 8 forms a gas expansion chamber and it also forms a safety device and prevents, in the manner hereinafter described, breakage of bottles when the apparatus is employed in bottling, or damage to parts of the apparatus when used for supplying aerated liquid on draft, or breakage and damage when the apparatus is intended for the two-fold purpose.

14 is a wheel or disk that is mounted on the solid end of the shaft 4. The pump 5 is mounted on the standard 2 below the wheel 14 and in line with the shaft 4, and its plunger is connected with the wheel 14 by a connecting rod 15. The stroke of the plunger may be varied by alteration of the position at which the rod 15 is connected to the wheel 14.

16 is a flanged casting secured to the extreme outer end of the hollow portion of the shaft 4. To this casting is bolted or otherwise secured a second flanged casting 17, which latter forms a bottle frame carrier and a bottle socket. The casting 17 is bored out, or is otherwise formed with a hole 18, of a diameter equal to the diameter of the hollow portion of the shaft 4 and the two flanged castings are secured together in such a manner that the hole 18 is in line with, and forms a continuation of the hollow portion of the shaft 4. 19 is a duct formed through the casting 17 at right angles to the hole 18 and in communication with the inner end thereof by a duct 20. The duct 19 terminates at one end within the part of the casting that forms the bottle socket and at the other end in a recess 21 provided to receive and hold a valve 22. This valve 22, which may be of any suitable construction, is the "snift" valve of the bottling part of the apparatus and is controlled and operated by a lever 23 pivoted to the casting 17 and held by a spring 24, partly contained within a recess formed in the casting 16, in such a position that the valve 22 is normally held in a position to close the end of the duct 19 leading into the recess 21. The lever 23 is of such length that its free end extends toward, and nearly to, the outer face of the removable end closure of the aerating chamber 1.

25 is a valve that controls the passage 20. This valve is contained within the hole 18 and is connected to one end of a rod or spindle 26 that extends longitudinally of, and within, the hollow shaft 4 and for the greater portion of its length is of such a diameter that a fairly large annular space is formed between it and the inner wall of the hollow shaft. The remainder of the length of the spindle 26 is of larger diameter, but is not so large as to prevent the free flow of liquid between it and the inner wall of the hollow shaft.

27 is a spring contained between the inner ends of the enlarged part of the spindle 26 and the hollow shaft 4.

28 are longitudinally and diametrically arranged slots formed through the wall of the shaft.

29 is a pin mounted in the enlarged part of the spindle 26 and extending through the slots 28.

30 are rollers mounted on the ends of the pin 29 and 31 are cams formed on the inner face of the removable end closure of the aerating chamber 1 and with which the rollers 30 coöperate.

32 is a collar secured to the shaft 4 and having laterally projecting arms 33 on the outer ends of which are mounted rollers 34. The collar 32 is secured in such position that it abuts, when the shaft 4 is in position, against the inner face of the fixed end closure of the aerating chamber 1 and so limits or prevents endwise movement of the shaft in one direction. The collar 32 is further so disposed that its arms 33 are at an angle to the pin 29. This is clearly shown in Fig. 4. The gas valve 13 is positioned so that the rollers 34 come in contact with its spindle and cause it to be operated twice in every revolution of the shaft 4.

35 is a cam fixed to the outer face of the removable end closure of the aerating chamber 1 and positioned so as to act on the free end of the lever 23 as this lever moves around with the shaft 4. When the cam 35 acts on the free end of the lever, the other end thereof is raised and moved away from the valve 22, which is then free to rise from its seat. 36 is a second collar fixed to the shaft 4 and arranged to abut against the inner face of the removable end closure, when the shaft is in position, and thus endwise movement of the shaft in one direction is prevented or limited. By means of the collars 32, 36 the shaft 4 is held from endwise movement in both directions.

37 is a paddle carried by the shaft 4 and employed to agitate the liquid in the aerating chamber 1 as the shaft rotates.

38 is the bottle frame. The frame comprises two bolts 39 each mounted in a laterally projecting arm or lug on the casting 17 and connected together at their outer ends by a cross piece 40 in which is mounted a screw threaded spindle 41 on which the bottle plate 42 is mounted.

43 is wire netting or gauze, semicircular in shape and attached at its sides to the bolts 39.

44 is a handle attached to the cross piece 40 and by which the bottle frame 38, castings 17, 16, shaft 4 and connected parts may be rotated or driven.

The apparatus thus far described is suitable for aerating liquids and bottling liquids so aerated.

In first starting the apparatus, the shaft 4 is rotated several times in order that liquid may be pumped into the aerating chamber 1 and its level brought up to that of the slots 28 in the shaft 4. When so much liquid has been pumped into the aerating chamber 1 the bottle frame is moved into a position approximately indicated by the dotted line Y in Fig. 5, which is a diagram showing the extreme positions of the axis of the bottle frame during the various operations involved in the filling of a bottle. A bottle is then taken, placed within the frame with its mouth in contact with the bottle socket and secured in position by means of the adjustable plate 41. The frame 38 and with it the shaft 4 and connected parts are then set in rotation and while moving to the position indicated by the line B, a roller 34 comes in contact with the spindle of the valve 13 and moves this valve downwardly against the pressure of the gas in the expansion chamber and the action of the spring. As soon as the valve is opened, gas rushes from the expansion chamber 8 into the aerating chamber, passing through the liquid therein. It will be noticed that the valve 13 is only opened for as long as the roller 34 is in contact with its spindle. The entrance of gas is thus for a very short period only. At the position indicated by the line B, the rollers 30 come in contact with the cams 31 which are of such shape that, as the rollers 30 move relatively thereto, the spindle 26 is shifted endwise against the action of the spring 27 and the valve 25 is moved away from the end of the passage 30. Liquid under pressure is thus permitted to flow from the aerating chamber 1 through the slots 28, the annular space between the spindle 26 and the inner wall of the hollow shaft 4, and the ducts 20, 19 into the bottle. As the axis of the bottle frame approaches the position indicated by the line C, the rollers 30 move out of contact with the cams 31, and the spring 27 causes the spindle 26 to move endwise and the valve 25 to close the end of the passage 20. During the movement of the bottle frame from the position indicated by the line C to that indicated by the line D, the free end of the lever 23 comes in contact with the cam 35 and is depressed. The other end of the lever is consequently raised and the valve 22 freed. When liquid was charged into the bottle during the movement of the bottle frame between positions B and C, a certain amount of air was compressed in the bottle. This air naturally tends to escape and when the holding down pressure of the lever 23 is removed, this compressed air raises the valve 22 from its seat. The compressed air is thus allowed to escape. The escape is rendered possible by a duct 139 formed in the casting 17 and opening at one end into the recess 21, the other end of the duct 139 terminates in a groove 140 formed by and between the contiguous faces of the flanged castings 16, 17. The groove 140 is so formed and positioned that its mouth is directed downwardly and away from the operator when the compressed air is allowed to escape or snift. As the bottle is more or less upright when this snift or discharge of compressed air is taking place it will be readily understood that little or no liquid will be blown out by or with the air and that by such air and the small amount of liquid, if any, blown out thereby being directed away from the operator, he is not incommoded thereby. When the bottle frame reaches the position indicated by the line D, the free end of the lever 23 will have moved out of contact with the cam 35, the spring 24 will have operated and caused the lever to turn on its pivot in the opposite direction to that just mentioned and to close the valve 22. As the bottle frame is moving from the position indicated by the line D to that indicated by the line E, one of the rollers 34 comes in contact with the spindle of the valve 13, opens this valve and permits gas to pass from the expansion chamber 8 into the aerating chamber and restores the pressure therein, such pressure having been reduced by the discharge of aerated liquid into the bottle when the bottle frame was moving between the positions indicated by the lines B to C. In moving from the position indicated by line E to that indicated by line A, the rollers 30 again come in contact with the cams 31, the valve 24 is opened and aerated liquid flows from the aerating chamber into the bottle. When the bottle frame reaches the position indicated by line A, the bottle is full and if the bottle frame be moved to the position indicated by the line Y and the full bottle removed it will be in a position to receive an empty bottle. As the shaft 4 rotates, so are the wheel 14 and pump 5 driven and liquid is forced by the pump into the aerating chamber.

In the foregoing description it has been assumed that a bottle is filled in two charges and during one complete revolution of the bottle frame, but it will be obvious that the filling may be otherwise and it will be preferably arranged to take place during, say, two or more complete revolutions of the bottle frame and that in such event the bottle is filled in four or more charges.

The construction and operation of the apparatus when used solely for bottling the aerated liquid having been described, the additions necessary to enable such a machine to be used also for supplying aerated liquid on draft will now be dealt with.

50 is a cylinder mounted on the standard 2 and 51 is a pipe connected at one end with the aerating chamber 1 and at the other end with a valve casing 52, that is also in connection with the cylinder 50. The valve of the valve casing 52 is normally held in a closed position by a spring so that communication between the aerating chamber and the cylinder 50 is interrupted.

53 is the casing of a valve normally held closed by a spring, but which, when opened, allows compressed air to escape or snift from the cylinder 50. The valve stems of the valves 52, 53 extend from the casings toward the inner face of the wheel 14 which is provided with two sets of cams 54, 55, the cams 54 coöperating with the spindle of valve 52 and the cam 55 with the spindle of valve 53. The cams 54, 55 do not act directly on the end of the valve spindles, but on levers 56, 57, mounted on a shaft 58 carried by brackets 59 mounted on the aerating chamber 1. The levers 56, 57 have rollers 60, 61 mounted at their ends which roll and bear on the cams 54, 55 and at points between their ends have devices 62, 63 which are adjustable and by which the stroke of the valves may be varied.

The parts just described in detail are illustrated in Figs. 6 and 7, Fig. 6 being a developed view of the wheel 14 and Fig. 7 a plan view of the upper part of the cylinder 50.

In operation, as the wheel 14 rotates, the valves 52, 53 are actuated. When the wheel 14 is moved through the space represented by the lines B—C, one of the cams 54 acts on the lever 56, the valve 52 is opened and liquid passes from the aerating chamber into the cylinder 50. As the wheel 14 rotates through the space represented by the lines C—D, the cam 55 acts on the lever 57, the valve 53 is opened and air compressed by the aerated liquid previously delivered to the cylinder 50 is allowed to snift or escape. The second of the cams 54 now comes into operation for the part of the rotation of the wheel 14 represented by the lines E—A and a further supply of aerated liquid is delivered to the cylinder 50. While the wheel 14 rotates the gas valve 13 is opened and gas is allowed to pass from the expansion chamber into the aerating chamber 1, gas being admitted at the periods mentioned when dealing with the apparatus as designed for aerating and bottling only. The cylinder 50 is connected by a pipe 64, which extends to the bottom of the cylinder, to the draft arm or other device by which delivery of the aerated liquid is effected.

The levers 56, 57 are mounted on the shaft 58 in such manner that they can be shifted therealong and moved out of the way of the cams 54, 55. When so moved the valves 52, 53 will not be operated on rotation of the wheel 14 and aerated liquid will not be supplied to the cylinder 50. This part of the apparatus will thus be thrown out of action. The bottling part of the apparatus can also be thrown out of use by the insertion of a suitable stopper in the bottle socket.

If the machine is to be used at all times for aerating and bottling only, the cylinder 50, the cams 54, 55 and the appurtenant parts mentioned in connection therewith are omitted. Likewise when the machine is to be used at all times for draft purposes only, the bottle frame 38, the castings 16, 17 and appurtenant parts are omitted and the hollow shaft 4 is replaced by a solid shaft having arms 33 and rollers 34 for operation of the gas valve 13 and a handle by which rotation may be imparted to the solid shaft. Or an electric or other motor may be arranged to drive the wheel 14.

The chamber 8, in addition to forming an expansion chamber for the gas acts, as already stated, as a safety device. The provision of such device is most essential and important. If an operator be careless and rotate the apparatus oftener than is required to fill a bottle or to supply the draft demand, the aerating chamber will gradually fill and there will be no escape for the liquid. By the connection of the expansion chamber with the aerating chamber 1, an additional space will be provided and liquid delivered in excess to the aerating chamber will open the gas valve 13 and pass along the pipe 12 to the expansion chamber from which it can be withdrawn by a cock 65.

Aerating and bottling machines have usually been provided with double bottle frames. Single bottle frames have also been proposed and are in use, but the construction of the frames, the arrangement of the ducts leading the liquid from the aerating chamber and the operation of the valves controlling the ducts have not been such as to permit of the bottling of liquid in bottles other than of the internally stoppered type. Nor has it been possible to introduce a charge of syrup or flavoring into the bottle and then place it within the frame to be filled with aerated liquid. The possibility of bottling aerated liquids in bottles closed by a cork, screw stopper or swinging stopper in rotary bottling frames has many advantages in actual practice, as also has the introduction of a charge of syrup or flavoring direct into a bottle and before the introduction of aerated liquid. When the bottle is of the internally stoppered type, the bottle has to be removed from the bottle frame when the bottle is in a more or less vertical position and with its mouth pointing downward. The reason for this lies in the method of stoppering employed. But with bottles closed by a cork, screw stopper or swinging stopper it is not possible to remove a filled bottle when its mouth is pointing downward; the removal must take place when its mouth is pointing upward and this position for removal can only be obtained when the introduction of liquid into the bottle is arranged to take place in the order and in the positions of the bottle frame already described. With known single and double rotary bottle frames it is not possible to insert and remove a bottle from the bottle frame when the mouth of the bottle is pointing upward; this is by reason of the positions of the bottle frame when liquid is passed into the bottle.

The suspension or mounting of the bottle frame at one end also has the advantage that the ducts 20, 19 can be made very short in length and can thus contain only a very small amount of liquid. When therefore the snift valve 22 is opened, the escaping compressed air has only a small amount of liquid to expel and the snift consequently consists practically of dry air only. With the ordinary single and centrally mounted bottle frame long ducts are a necessity and it is impossible to get a dry snift.

The positions of the bottle frame at which aerated liquid is delivered from the aerating chamber into the bottle permits of the introduction of a charge of syrup or flavoring into the bottle before the same is inserted into the bottle frame. It will be seen from an inspection of Fig. 5 that the opening of the valve 25 does not take place until the axis of the bottle frame is moving from the position indicated by the line B. With an internally stoppered bottle the insertion of the bottle into the bottle frame can be delayed until the axis of the bottle frame is almost horizontal and the contained charge of syrup or flavoring will not be spilled as it would be were it compulsory to introduce the bottle in an inverted position i. e. when it is on the line Y. With bottles closed by a cork, screw stopper or swinging stopper, the bottle whether containing a charge of syrup or flavoring, or not, is introduced into the bottle frame at the position indicated by the line D and is also removed when the bottle frame again arrives at the same position.

What I claim is:—

1. In an apparatus for aerating liquids, the combination of a stationary aerating chamber, an expansion chamber normally out of communication with said aerating chamber, means controlling communication between said chambers, means for supplying gas to said expansion chamber and means for periodically establishing communication between said expansion and aerating chambers, said controlling means being adapted to operate automatically on an excess of liquid in the aerating chamber.

2. In an apparatus for aerating liquids, the combination of a stationary aerating chamber to which liquid is delivered, an expansion chamber normally out of communication with said aerating chamber and to which gas is supplied, a valve controlling communication between said chambers, means for opening said valve periodically to admit gas from said expansion chamber to said aerating chamber and means whereby said valve will open automatically on an excess of liquid in said aerating chamber and permit said excess to pass to said expansion chamber.

Dated this 21st day of June, 1910.

ARTHUR JAMES BILLOWS.

Witnesses:
 JOHN E. RAWORTH,
 W. B. PRINCE.